A. E. NAISH.
ADJUSTABLE CRANK SHAFT BEARING.
APPLICATION FILED MAR. 25, 1918.

1,289,876.

Patented Dec. 31, 1918.

Inventor:
Albert E. Naish,
by Hazard and Miller
Att'ys.

UNITED STATES PATENT OFFICE.

ALBERT EDWARD NAISH, OF OAKLAND, CALIFORNIA.

ADJUSTABLE CRANK-SHAFT BEARING.

1,289,876.  Specification of Letters Patent.  Patented Dec. 31, 1918.

Application filed March 25, 1918. Serial No. 224,646.

*To all whom it may concern:*

Be it known that I, ALBERT EDWARD NAISH, a citizen of the United States, residing at Oakland, in the county of Alameda and State of California, have invented new and useful Improvements in Adjustable Crank-Shaft Bearings, of which the following is a specification.

My object is to make an improved adjustable crank shaft bearing and my invention consists in the novel features herein shown, described and claimed.

Figure 1:
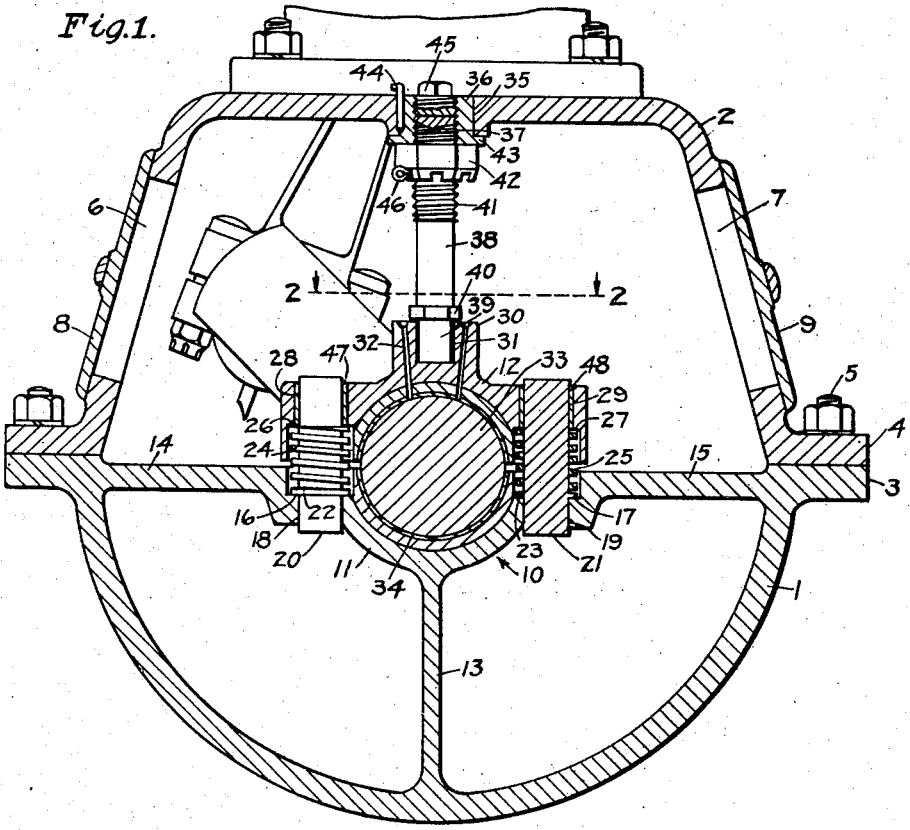
Figure 1 is a cross-section through a crank case provided with an adjustable crank shaft bearing in accordance with the principles of my invention.
Figure 2:
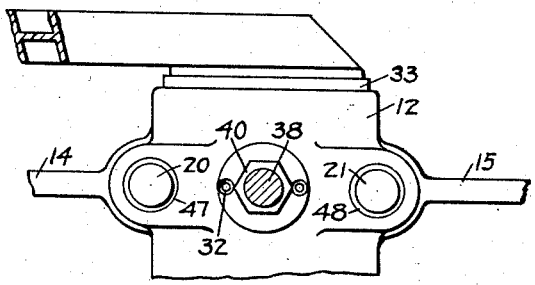
Fig. 2 is a fragmentary horizontal sectional detail on the line 2—2 of Fig. 1 and looking downwardly.

The crank case comprises the base 1 and the cap 2 provided with flanges 3 and 4 secured together by bolts 5; there being man-holes 6 and 7 in the cap closed by covers 8 and 9.

The base 1 is semi-circular in cross-section and the adjustable crank shaft bearing 10 is located at the center of the circle and comprises the lower half bearing 11 and the upper half bearing 12.

The lower half bearing 11 is formed integral with the base 1 and is supported by a vertical post 13 and horizontal braces 14 and 15. Spring seats 16 and 17 are formed by boring downwardly in the braces 14 and 15 and in the sides of the half bearing 11, and guide pin seats 18 and 19 are formed by boring downwardly at the center of the spring seats 16 and 17. The guide pins 20 and 21 fit tightly in the seats 18 and 19 and have shoulders 22 and 23 resting upon the spring seats 16 and 17. Expansive coil springs 24 and 25 fit around the pins 20 and 21 against the shoulders 22 and 23.

The upper half bearing 12 has spring seats 26 and 27 formed by boring upwardly at the sides of the bearing, and the springs 24 and 25 extend upwardly around the pins 20 and 21 and fit against the seats 26 and 27, and guide pin seats 28 and 29 are bored upwardly through the sides of the bearing at the center of the spring seats 26 and 27, and the guide pins 20 and 21 extend slidingly through these seats 28 and 29.

A boss 30 extends upwardly from the half bearing 12 at its center, there being an adjusting screw seat 31 bored downwardly into the boss and there being oil holes 32 bored downwardly through the boss and through the bearing at the sides of the seat 31.

The crank shaft 33 is placed between the half bearings 11 and 12, there being suitable linings 34 in the half bearings around the shaft. A vertical opening 35 is bored through the cap 2 in vertical alinement with the adjusting screw seat 31 and a bushing 36 is placed in this opening, there being a smooth bore 37 through the bushing. The adjusting screw 38 has its lower end 39 turned to fit in the seat 31, there being a wrench head 40 above the portion 39 and there being a screw thread 41 upon the upper end of the screw fitting loosely in the bore 37. An adjusting nut 42 is mounted upon the screw threads 41 against the lower end of the bushing 36, said bushing 36 having a flange 43 fitting against the lower face of the cap 2 around the bore 35 to prevent the bushing from being pushed upwardly through the cap, and the nut 42 fitting against the flange 43.

The expansive coil springs 24 and 25 serve as equalizers to hold the upper half bearing 12 level relative to the lower half bearing 11. The nut 42 is adjusted upon the screw to compress the springs 24 and 25 to adjust the half bearing 12 to properly fit the crank 33. A wrench may be applied to the wrench seat 40 to hold the screw 38 while the nut 42 is being adjusted or the nut may be held while the screw is adjusted, and as the linings 34 wear, the screw may be adjusted from time to time to take up the wear.

Bushings 44 and 45 of good metal are preferably inserted into the seats 28 and 29 and the upper ends of the pins 20 and 21 slidingly mounted in the bushings.

While I have shown a single pair of guide pins 20 and 21 and a single adjusting screw 38, it is obvious that if the bearing is long enough two pairs of guide pins may be used and two adjusting screws may be used.

Instead of mounting the upper end of the screw 38 in the cap 2 a spider might be provided.

An adjustable bearing constructed in accordance with the principles of my invention as shown and described does away with the necessity for shims between the two half bearings and simplifies the adjustment of the bearing to keep it tight upon the shaft, the adjustment may be quickly and easily made, the linings of the bearing may be easily renewed, and the bearings may be kept constantly tight, so as to prevent rattling and pounding, thereby greatly increasing the life of the linings.

Various changes may be made in the details of construction without departing from the spirit of my invention as claimed.

I claim:

1. An adjustable crank shaft bearing comprising the combination with a crank case having a base and a cap, of a lower half bearing formed integral with the base and having spring seats and guide pin seats at the sides of the bearing, an upper half bearing in opposition to the lower half bearing and having spring seats and guide pin seats in alinement with the lower spring seats and guide pin seats, guide pins in the guide pin seats, expansive springs around the guide pins in the spring seats, and an adjusting screw mounted to press downwardly upon the upper half bearing.

2. In an adjustable crank shaft bearing, the combination with a crank case having a base and a cap, of a lower half bearing rigidly mounted upon the base, an upper half bearing in opposition to the lower half bearing, guide pins for holding the two half bearings in alinement, expansive coil springs between the two half bearings, and an adjusting screw engaging the cap and pressing downwardly upon the center of the upper half bearing.

3. In an adjustable crank shaft bearing, a lower half bearing rigidly mounted, an upper half bearing in opposition to the lower half bearing, means for holding the upper half bearing in alinement with the lower half bearing, an adjusting screw having its lower end seated in the upper half bearing, and means for holding the upper end of the adjusting screw; so that by manipulating the adjusting screw the upper half bearing may be pressed toward the lower half bearing.

In testimony whereof I have signed my name to this specification.

ALBERT EDWARD NAISH.

Copies of this patent may be obtained for five cents each, by addressing the "Commissioner of Patents, Washington, D. C."